Patented Mar. 14, 1950

2,500,317

UNITED STATES PATENT OFFICE 2,500,317

PRODUCTION OF LINEAR POLYAMIDES

James Lincoln, London, England, assignor to Celanese Corporation of America, a corporation of Delaware No Drawing. Application March 5, 1946, Serial No. 652,237. In Great Britain March 16, 1945

6 Claims. (Cl. 260—78)

This invention relates to improvements in the production of polymers.

It is well known that the production of condensation polymers of high molecular weight from amino-acids is practically impossible with amino-acids lower than 6-amino-caproic acid. If γ-amino-butyric acid or δ-amino-valeric acid is heated, the product appears to be exclusively the lactam. With α-amino-acids such as glycine, the product consists very largely of glycine anhydride or its derivatives. With β-amino-acids such as β-alanine, heating tends to decompose them with production of ammonia and an acrylic acid, which itself polymerises by the vinyl type of polymerisation to produce an addition polymer. I have now found that β-amino-acids which contain no hydrogen atom attached to the α-carbon atom do not exhibit this tendency to develop ammonia on heating and that such acids can be caused to undergo self-condensation, e. g. by heating, to produce linear polyamides which, if of sufficiently high molecular weight, are fibre-forming. Acids of the above character are completely substituted at the α-carbon atom. Such a completely substituted carbon atom is for the purpose of the present specification termed a "tertiary carbon atom."

The polyamides obtainable by the process of the invention are characterised by containing in their structure the residue of a β-amino-acid, all the substituents on the α-carbon atom of which are other than hydrogen. On hydrolysis these polymers are converted back to the original amino-acid. Most of the polymers of the invention contain the structural unit

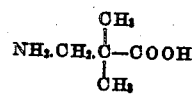

R and Y being hydrogen or alkyl, preferably the former, the substituents X being other than hydrogen. The substituents X are preferably alkyl e. g. methyl.

Generally the acids used according to the present invention are of the type

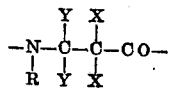

where the substituents X are other than hydrogen and where the substituents on the nitrogen atom and the β-carbon atom may be and preferably are hydrogen. The simplest amino-acid of this type is amino-pivalic acid,

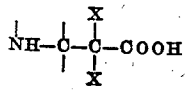

Other amino-acids, the condensation of which is included within the scope of the present invention, are β-amino-ααβ-trimethyl propionic, β-amino-αα-diethyl propionic, β-amino-α-methyl-α-ethyl-propionic and β-amino-α-methyl-α-phenyl propionic acids.

Moreover, the invention includes the case in which the two substituents on the α-carbon atom of the β-amino-acid form part of or are capable of forming during the condensation a ring system, or in which the α-carbon atom is part of a ring system which includes the β-carbon atom. Such starting materials include, for example, 2-amino-1-methyl-cyclohexane-1-carboxylic acid and 1-aminomethyl-cyclohexane-1-carboxylic acid.

Methods suitable for the preparation of the various amino-acids specified above are given in U. S. application S. No. 715,333 filed December 10, 1946 corresponding to British application No. 34,284/45 filed December 18, 1945. For instance β-amino-αα-diethyl-, β-amino-α-ethyl-α-methyl- and β-amino-α-methyl-α-phenyl-propionic acids can be obtained by hydrogenation of diethyl cyanacetic ester, ethyl methyl cyanacetic ester and methyl phenyl cyanacetic ester respectively, preferably in presence of ethyl formate to give the N-formyl ester which is readily hydrolysed to the free amino-acid. An analogous method is available for the preparation of 1-amino methyl-cyclohexane-1-carboxylic acid from 1-cyano-cyclohexane-1-carboxylic ester. The last-mentioned body can be prepared by reaction of pentamethylene dibromide with cyanacetic ester or by treatment of 1-chloro- or 1-bromo-cyclohexane-carboxylic ester with a metal cyanide. β-amino-ααβ-trimethyl propionic acid can be prepared by hydrogenation of dimethyl acetoacetic ester in presence of ammonia, the free amino acid being isolated after hydrolysis of the product. A like reaction, in this case the simultaneous amination and reduction of 1-methyl-cyclohexane-2- one-1-carboxylic acid or ester gives 2-amino-1-methyl-cyclohexane-1-carboxylic acid.

The β-amino acids of the above type may be used as such for the polymerisation, i. e. with the amino and carboxy groups free, or the amino group may be present in the form of an acid amide group in which the acid radicle is readily split off as with the formyl-amino or isobutyryl-amino group, while the carboxylic acid group may be replaced by equivalents such as carboxylic ester, carboxylic halide or carboxylic amide. Generally it is preferred to employ the free acid or the ester and to carry out the polymerisation by simple heating, for example to 150–300° C. The amino-acid may be heated alone, particularly if it and its early polymerisation products melt at about amide forming temperatures or below. However, it is often more convenient to carry out the condensation in presence of an inert diluent, which is preferably a solvent both for the starting material and for the polymer, for example a phenolic body, including phenol, the cresols and the xylenols. The polymerisation, as is usual with amide-forming reactions, is preferably carried out in absence of oxygen, for example in the presence of oxygen-free nitrogen or in the presence of hydrogen or other inert gas. Towards the end of the condensation, it is generally preferable to heat under reduced pressure in order to eliminate the water or other by-product of the condensation. This is not the case in the early stages of condensation, and indeed water may be added to the reaction mixture and eliminated at the later stages.

The degree to which the condensation reaction goes to completion, and hence the molecular weight of the polymer, can be increased, other things being equal, by effecting the polymerisation with the reactant or reactants spread in a thin layer, thus allowing ready elimination of water vapour or other product of condensation. Another expedient is to remove water as formed by means of an entraining vapour, e. g. of a hydrocarbon or phenol.

In addition to the self-condensation of aminopivalic acid and related acids or mixtures of these amino-acids, the invention includes the co-condensation of these amino-acids with other reagents capable of forming linear polyamides, e. g. an appropriate amino-acid, for example ω-aminocaproic acid, a substantially equimolecular mixture of hexamethylene diamine and adipic acid or other appropriate diamine and dicarboxylic acid. By such co-condensation it is possible to obtain a series of polyamides of widely varying melting point and solubility properties.

The invention is illustrated by the following examples, all parts being by weight:

*Example 1*

Aminopivalic acid was prepared by one of the methods covered in said U. S. application S. No. 715,333 corresponding to British application No. 34,284/45 filed December 18, 1945, namely by hydrogenation of dimethyl cyanacetic ester in presence of ethyl formate, isolation of the formyl aminopivalic ester by distillation, and hydrolysis to the free amino-acid M. 239–41° C.

Found: C, 51.41; H, 9.47; N, 11.90%. $C_5H_{11}O_2N$ requires C, 51.23; H, 9.46; N, 11.88%.

2 parts of the amino-acid, 5 parts of m-cresol and 1 part of water were heated in a slow stream of hydrogen at 190° for 200 hours, loss of m-cresol by evaporation being made up by periodical additions as required to maintain a fluid, homogeneous mixture. The polyamino-pivalic acid was precipitated as a white, amorphous powder by addition of acetone to the cresol solution. It melted at about 270° C., had intrinsic viscosity (1% solution in m-cresol) about 0.4 and filaments could be obtained from the melt by touching the surface with a glass rod and drawing it away. Aminopivalic acid hydrochloride could be recovered in good yield from the polymer by hydrolysis with 20% hydrochloric acid at the boil.

*Example 2*

1 part of aminopivalic acid and 0.2 part of aminopivalic ethyl ester [prepared by esterification of the amino-acid in absolute ethanol containing hydrochloric acid; B. 74–5°C./18 mm., $n_D^{20}$ 1.4294; Found: N, 9.46%; equivalent 146.5; $C_7H_{15}O_2N$ requires N, 9.62%; equivalent 145.0] were mixed and heated at 255° in a hydrogen stream for 0.5 hour, during which time the mixture first melted and then resolidified. The product was then heated at 280–285° for 2 hours at atmospheric pressure and 2 hours at 0.5 mm. The resultant polymer was an ivory-like, almost white solid, M. P. about 270° C., soluble in formic acid and m-cresol, the intrinsic viscosity of a 1% solution in the latter solvent being about 0.35. The elementary analysis was satisfactorily close to theory for the unit

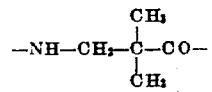

*Example 3*

1 part of aminopivalic acid and 1 part of hexamethylene diammonium adipate (the amino pivalic acid being 69.1 mol per cent of the reactants) were heated in hydrogen for 2 hours at 270° C., atmospheric pressure, and 2 hours at 270°/1 mm. The polymer resulting had intrinsic viscosity (1% in m-cresol) about 0.4 and readily gave filaments from the melt. It melted over a range, softening first at about 140° C. with completion of melting at about 170° C.

The polymers of the invention are of value in connection with the production of films, fibres, lacquers and the like. For these applications the polymers may be mixed with other ingredients, for example cellulose acetate, aceto-butyrate, butyrate and aceto-stearate, ethyl cellulose, oxyethyl cellulose, oxyethyl cellulose acetate, benzyl cellulose and other cellulose derivatives, plasticisers or softening agents, dyestuffs, pigments and the like.

Having described my invention, what I desire to secure by Letters Patent is:

1. Process for the production of a linear polyamide which comprises heating a reaction mass whose sole reactant is amino pivalic acid at a temperature of 150 to 300° C. until a polymer is produced.

2. A linear polyamide which yields on hydrolysis a product consisting wholly of a β-aminocarboxylic acid in which the α-carbon atom is completely substituted by non-reactive groups and in which the amino and carboxy groups are the sole functional groups.

3. A linear polymer which yields on hydrolysis a product consisting wholly of amino-pivalic acid.

4. Process for the production of linear polyamides which comprises heating at a temperature of 150 to 300° C. until a polymer is produced a mixture, of which at least 69.1 mol per cent consists of a substance selected from the group consisting of β-primary amino carboxylic acids in which the α carbon atom is completely substituted by non-reactive groups and amide-forming derivatives of such acids and the β-amino group is the sole reactive β-substituent, the number of amino groups in the whole mixture from the beginning of and throughout the reaction being equal to the number of carboxylic groups therein, and the amino and carboxylic groups being the sole reactive groups present.

5. Process for the production of linear polyamides which comprises heating at a temperature of 150 to 300° C. until a polymer is produced a β-primary amino carboxylic acid, in which the α carbon atom is completely substituted by non-reactive groups and the β-amino group is the sole reactive β-substituent, in admixture with a diamine and a dicarboxylic acid, the β-amino carboxylic acid being present in a proportion of at least 69.1 mol per cent of the total polyamide-forming constituents and the number of amino groups in the whole mixture from the beginning of and throughout the reaction being equal to the number of the carboxylic groups therein.

6. Process for the production of linear polyamides which comprises heating at a temperature of 150 to 300° C. until a polymer is produced amino-pivalic acid with a mixture of hexamethylene diamine and adipic acid in which the amino pivalic acid constitutes at least 69.1 mol per cent of the total amide-forming constituents and in which the number of amino groups in the whole mixture from the beginning of and throughout the reaction is equal to the number of carboxylic groups therein.

JAMES LINCOLN.

REFERENCES CITED

The following references are of record in the file of this patent:

UNITED STATES PATENTS

| Number | Name | Date |
| --- | --- | --- |
| 2,293,388 | Hanford | Aug. 18, 1942 |
| 2,379,413 | Bradley | July 3, 1945 |
| 2,440,516 | Kropa | Apr. 27, 1948 |